United States Patent
Sinha et al.

(10) Patent No.: US 12,536,546 B2
(45) Date of Patent: Jan. 27, 2026

(54) ELECTRONICALLY SIGNING A DOCUMENT USING A PAYMENT CARD

(71) Applicant: MASTERCARD INTERNATIONAL INCORPORATED, Purchase, NY (US)

(72) Inventors: Ajay Sinha, Pune (IN); Lalit Manchanda, River Vale, NJ (US); Naveen Kumar Gupta, Pune (IN)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 92 days.

(21) Appl. No.: 18/488,024

(22) Filed: Oct. 16, 2023

(65) Prior Publication Data

US 2025/0124448 A1    Apr. 17, 2025

(51) Int. Cl.
  *G06Q 20/20* (2012.01)
  *G06Q 20/38* (2012.01)
  *G06Q 20/40* (2012.01)

(52) U.S. Cl.
  CPC ......... *G06Q 20/4018* (2013.01); *G06Q 20/20* (2013.01); *G06Q 20/3829* (2013.01); *G06Q 20/40* (2013.01)

(58) Field of Classification Search
  None
  See application file for complete search history.

(56) References Cited

U.S. PATENT DOCUMENTS

| 6,792,536 | B1 | 9/2004 | Teppler | |
| 10,885,410 | B1 * | 1/2021 | Rule | G06Q 20/3276 |
| 11,687,885 | B2 | 6/2023 | Clark et al. | |
| 2015/0371234 | A1 * | 12/2015 | Huang | G06Q 20/34 705/44 |
| 2016/0267486 | A1 * | 9/2016 | Mitra | G07F 7/0846 |

(Continued)

FOREIGN PATENT DOCUMENTS

WO    2023064063 A1    4/2023

OTHER PUBLICATIONS

Lee et al., "An NFC Anti-Counterfeiting Framework for ID Verification and Image Protection", Mobile Networks Applications, vol. 21, 2016, pp. 646-655.

(Continued)

*Primary Examiner* — William J Jacob
(74) *Attorney, Agent, or Firm* — Barta Jones, PLLC

(57) ABSTRACT

A computerized method electronically signs and authenticates documents using cards with associated private keys. A hash of a document is obtained from a user by a cloud point of sale (POS) server and a document signing request to sign the obtained hash with a card is received. The document signing request is received via the presentation of the card. The server causes the obtained hash to be signed using the private key of the card and an associated signature ID is generated. The signed hash and generated signature ID are stored, and the generated signature ID is provided to the user for use in future authentication of the document. Later, a document authentication request is received that includes the generated signature ID and a hash of a target document to be authenticated. The signed hash is decrypted and compared to the hash of the target document to determine its authenticity.

20 Claims, 7 Drawing Sheets

(56) References Cited

U.S. PATENT DOCUMENTS

| | | | |
|---|---|---|---|
| 2018/0137512 A1* | 5/2018 | Georgiadis | H04L 63/08 |
| 2021/0004786 A1* | 1/2021 | Mossler | H04L 9/3073 |
| 2021/0042753 A1 | 2/2021 | Wong et al. | |
| 2023/0086015 A1* | 3/2023 | Xiao | G07F 7/0853 |
| | | | 235/380 |
| 2024/0119132 A1* | 4/2024 | Wieker | G06V 40/1365 |
| 2024/0195631 A1* | 6/2024 | Yee | H04L 9/3213 |

OTHER PUBLICATIONS

Basin et al. "Inducing Authentication Failures to Bypass Credit Card PINs" Department of Computer Science ETH Zurich, retrieved Nov. 7, 2023, https://www.eftlab.com/knowledge-base/243-ca-public-keys, 15 pages.

Georgioska, Maja, "Application of Digital Signatures in the Electronic System for Public Procurement in Republic of North Macedonia", International Scientific Journal "Security & Future", Year IV, Issue 2, 2020, pp. 57-60.

* cited by examiner

ELECTRONICALLY SIGNING A DOCUMENT USING A PAYMENT CARD

BACKGROUND

Electronically signing a document is a cryptographic operation in which a cryptographic signature of the document is generated and can be verified later to establish the authenticity of the document. Digital signatures provide a high level of security and assurance of the authenticity of associated documents.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for electronically signing and authenticating documents using cards with associated private keys is described. A hash of a document is obtained from a user by a cloud point of sale (POS) server and a document signing request to sign the obtained hash with a card is received. The document signing request is received via the presentation of the card (e.g., to a physical POS device). The cloud POS server causes the obtained hash to be signed using the private key of the card and a signature identifier (ID) associated with the signed hash is generated. The signed hash and generated signature ID are stored in combination and the generated signature ID is provided to the user for use in future authentication of the document.

BRIEF DESCRIPTION OF THE DRAWINGS

The present description will be better understood from the following detailed description read considering the accompanying drawings, wherein:

Corresponding reference characters indicate corresponding parts throughout the drawings. In FIGS. 1 to 7, the systems are illustrated as schematic drawings. The drawings may not be to scale. Any of the figures may be combined into a single example or embodiment.

DETAILED DESCRIPTION

Aspects of the disclosure provide systems and methods for electronically signing documents using the encryption capabilities of payment cards and for authenticating those electronically signed documents. The disclosure enables a cloud point of sale (POS) server to manage the generation of the electronically signed document hashes, to store those signed document hashes, and to use the stored signed document hashes to later verify the authenticity of other instances of the document. In some examples, the cloud POS server of the disclosure is configured to obtain a hash of a document from a user and to receive a request to sign the hash using a payment card, such as a EUROPAY, MASTERCARD and VISA (EMV) card. The disclosure enables the cloud POS server to cause the obtained hash to be encrypted, or signed, using a private key that is associated with the payment card. The cloud POS server generates a unique signature identifier (ID) and stores it in association with the signed hash data. The signature ID is then provided to the user and/or other users as instructed by the user for use in later authenticating the document.

Further, in some examples, the disclosure enables the cloud POS server to receive a request to authenticate a target document with a signature ID associated with a signed hash stored on the cloud POS server. The server obtains a hash of the target document and a public key associated with the private key of the payment card used to sign the stored signed hash. The public key is used to decrypt the stored signed hash, and the resulting hash is compared with the hash of the target document to verify the authenticity of the target document. The results of the comparison are provided to the user in response to the request for document authentication.

The disclosure operates in an unconventional manner at least by leveraging encryption capabilities of payment cards and associated systems to electronically sign documents. In most cases, payment cards, such as EMV cards, include private keys that are used during transaction processing to validate the payment cards, etc. The disclosure uses the private keys to enable the efficient electronic signing and authentication of documents. In this manner, the disclosure eliminates and/or significantly reduces the resource costs associated with developing a separate electronic signature infrastructure for documents, and with operating and maintaining such an infrastructure.

Further, the disclosure enables documents to be electronically signed and/or authenticated using a cloud POS infrastructure. Thus, the user experience is simplified and checking documents for authenticity is made more accessible due to the ease with which most users can access a cloud POS system.

Figure 1:
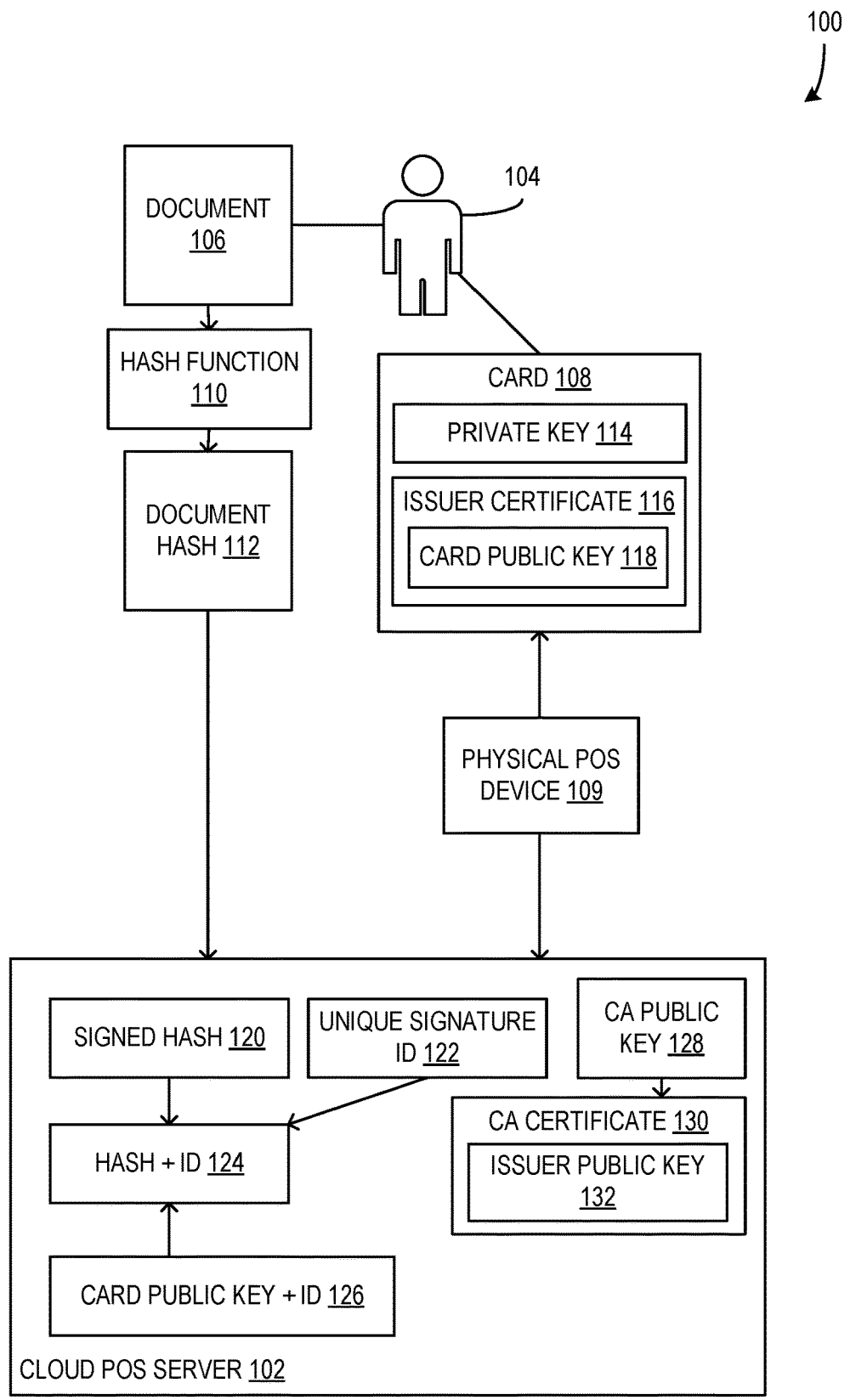
FIG. 1 is a block diagram illustrating a system configured to electronically sign a document using a card of a user.

FIG. 1 is a block diagram illustrating a system 100 configured to electronically sign a document 106 using a card 108 of a user 104. In some examples, the user 104 is enabled to generate a document hash 112 of the document 106 using a hash function 110. The document hash 112 is provided to the cloud POS server 102. The user 104 also provides access to the card 108 to the cloud POS server 102, including enabling the private key 114 to be used to sign the document hash 112 as described herein. The cloud POS server 102 is configured to use the card 108 to sign and/or encrypt the document hash 112 using the private key 114 to generate the signed hash 120. The cloud POS server 102 generates a unique signature ID 122 associated with the signed hash 120 and they are combined into the hash and ID 124. The card public key 118 of the card 108 is stored in combination with the unique signature ID 122. Thus, the cloud POS server 102 is configured to store information that can be used to determine the authenticity of the document 106 at a later time.

Figure 7:
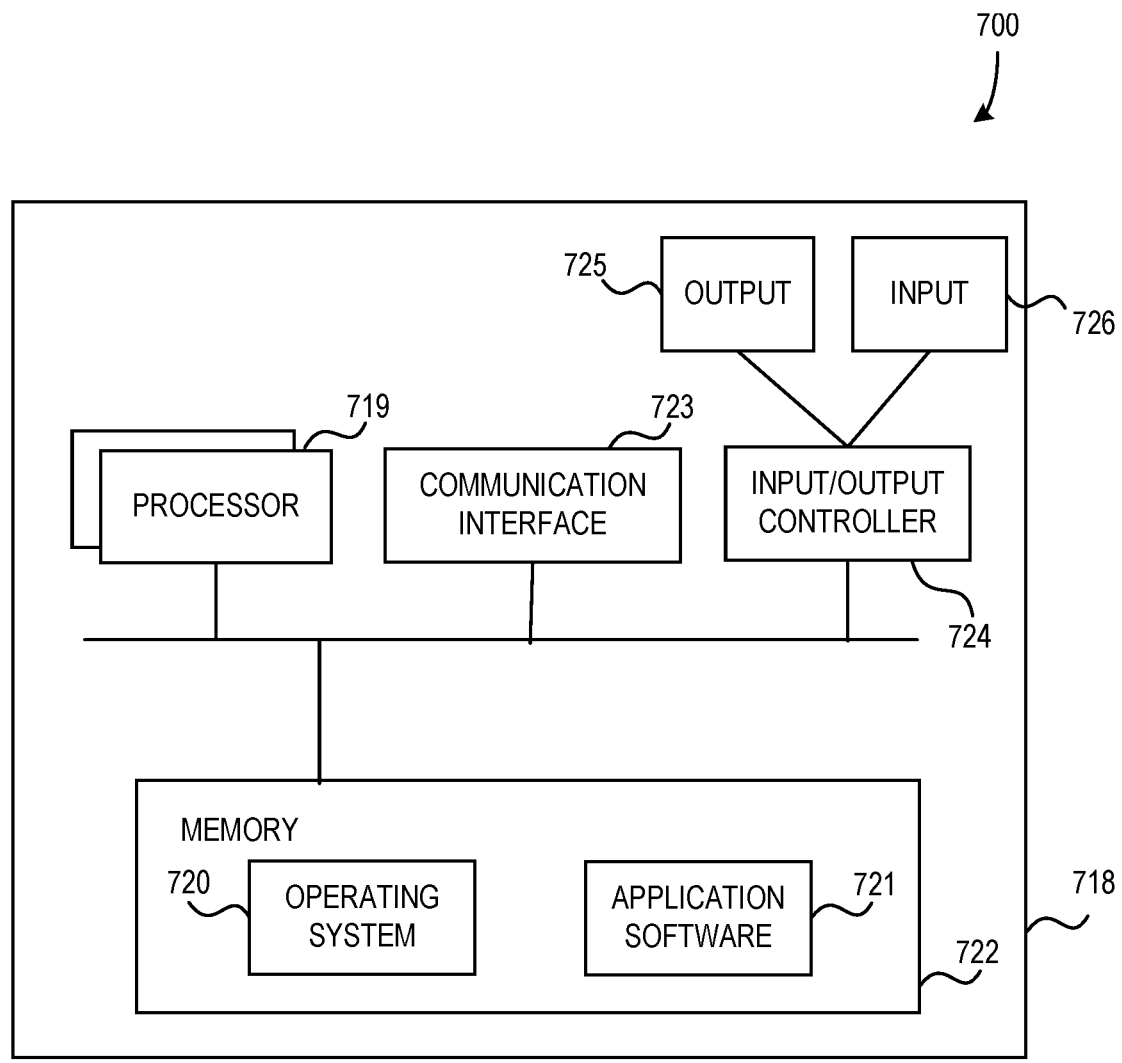
FIG. 7 illustrates an example computing apparatus as a functional block diagram.

In some examples, the system 100 includes one or more computing devices (e.g., the computing apparatus of FIG. 7 that are configured to communicate with each other via one or more communication networks (e.g., an intranet, the Internet, a cellular network, other wireless network, other wired network, or the like. In some examples, entities of the system 100 are configured to be distributed between multiple computing devices and to communicate with each other via network connections. For example, the cloud POS server 102 is executed on a first computing device, and the physical POS device 109 is a second computing device within the system 100. The first computing device and second computing device are configured to communicate with each other via at least one network connection. Alternatively, in some examples, components of the cloud POS server 102 (e.g., the module that generates the unique signature ID 122 and the module that stores the combined hash and ID 124) are executed on separate computing devices and those separate computing devices are configured to communicate with each other via network connections during the operation of the cloud POS server 102. Additionally, or alternatively, in some examples, the card 108 is provided to a physical POS device 109 that is configured to communicate with the cloud POS server 102 over the described network. In other examples, other organizations of computing devices are used to implement system 100 without departing from the description.

The cloud POS server 102 includes hardware, firmware, and/or software configured to enable the signing and authentication of documents 106 using private keys 114 of cards 108. Exemplary processes performed by the cloud POS server 102 are described in detail below with respect to FIGS. 2 and 4. In some examples, the cloud POS server 102 is configured to enable users 104 to provide document hashes 112 associated with the documents that are to be signed. Alternatively, or additionally, the cloud POS server 102 is configured to receive the documents 106 themselves and to perform a hash function 110 (e.g., Secure Hash Algorithm 256-bit (SHA-256)) on received documents 106 to generate document hashes 112 as described herein.

Further, in some examples, the cloud POS server 102 is configured to provide the document hash 112 to the card 108 and to receive an encrypted or signed hash 120 from the card 108, wherein the document hash 112 has been encrypted using the private key 114 of the card 108. Alternatively, or additionally, in some examples, the cloud POS server 102 is configured to receive the private key 114 from the card 108 (e.g., via a physical POS device 109 with which the card 108 interacts) and the cloud POS server 102 encrypts the document hash 112 using the private key 114, thereby generating the signed hash 120. In some such examples, the card 108 is a EUROPAY, MASTERCARD, and VISA (EMV) card or other type of payment card that has been issued by a bank or other financial entity, such that it includes the private key 114. Further, in some such examples, the private key 114 of the card 108 has been signed with a CA certificate as described herein, such that it is considered authenticated. Additionally, or alternatively, in some examples, the card 108 includes a chip with which other compatible devices (e.g., the physical POS device 109) can interact. In some examples, the document hash 112 is provided as input to the chip and the chip generates the signed hash 120 as output (e.g., the chip encrypts the data of the document hash 112 using the private key 114 which is embedded in the chip). In other examples, the card 108 is configured to operate in other ways without departing from the description.

In some examples, the cloud POS server 102 is configured to generate a unique signature ID 122 associated with the signed hash 120. In some examples, the generation of the unique signature ID 122 is performed using the data of the signed hash 120. Alternatively, or additionally, the generation of the unique signature ID 122 includes generating a universally unique ID (UUID) that is associated with the signed hash 120 and can later be used to identify the signed hash 120. Further, the cloud POS server 102 is configured to combine and store the signed hash 120 and the unique signature ID 122 together in the form of a combined hash and ID 124.

Further, in some examples, the cloud POS server 102 is configured to obtain the card public key 118 associated with the card 108 and to store the card public key 118 with the unique signature ID 122 in the form of a combined ID and card public key 126. In some such examples, the card public key 118 is provided to the cloud POS server 102 in the form of an issuer certificate 116, wherein the card public key 118 is encrypted and/or signed using a private key of the issuer of the card 108. In order to obtain the card public key 118, the cloud POS server 102 is configured to obtain the issuer public key 132 and to decrypt the issuer certificate 116 using the issuer public key 132.

Additionally, in some examples, the issuer public key 132 is obtained by the cloud POS server 102 in the form of a certification authority (CA) certificate 130, wherein the issuer public key 132 is encrypted using a CA private key. In order to decrypt the CA certificate 130 to obtain the issuer public key 132, the cloud POS server 102 obtains the CA public key 128 from the CA. Thus, through the use of these layers of electronic signatures, the authenticity of the obtained card public key 118 is confirmed to the extent that the CA is trusted by the cloud POS server 102.

Figure 2:
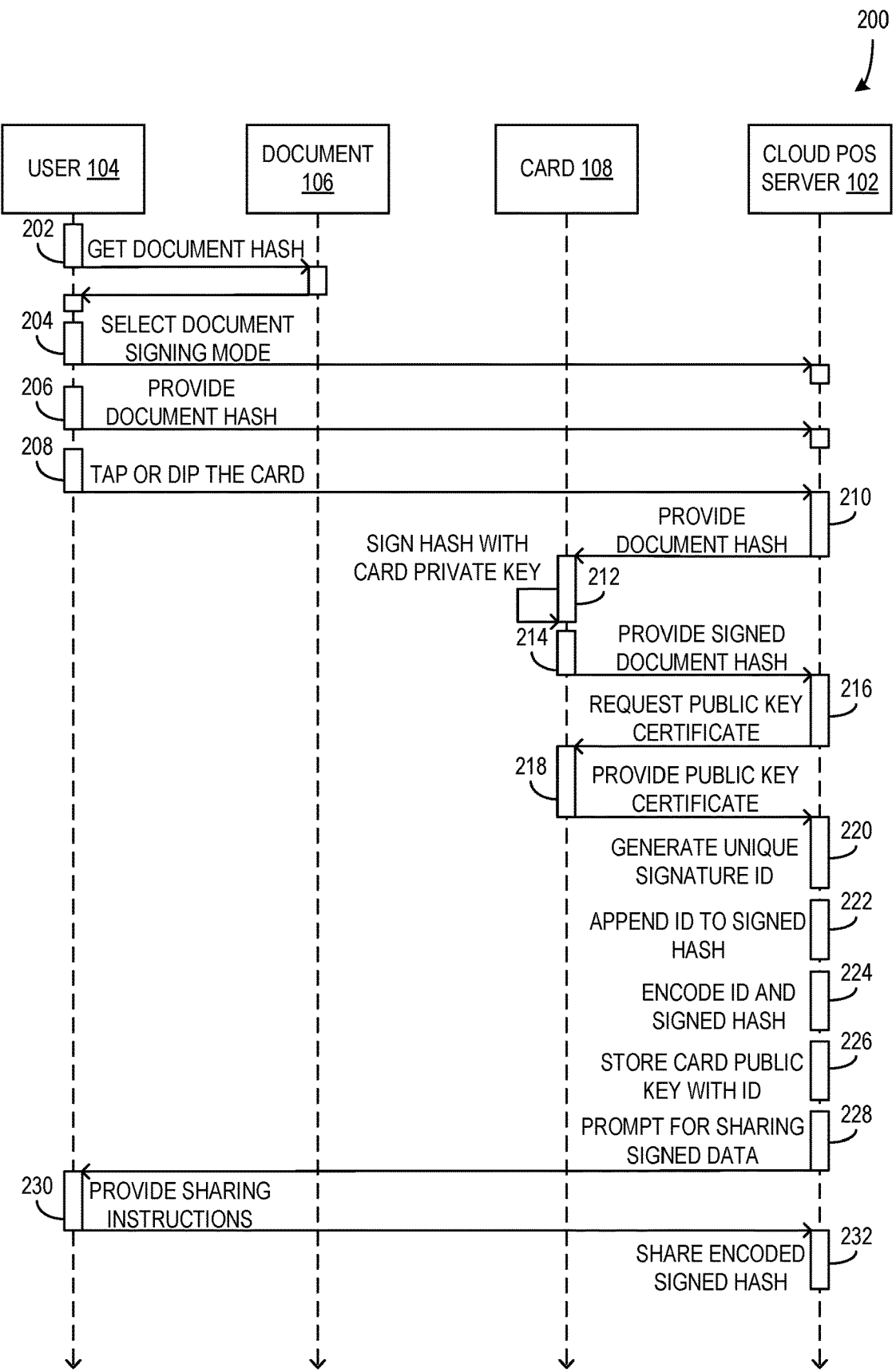
FIG. 2 is a sequence diagram illustrating a process for electronically signing a document using a card of a user.

FIG. 2 is a sequence diagram illustrating a process 200 for electronically signing a document 106 using a card 108 of a user 104. In some examples, the process 200 is executed or otherwise performed in a system such as system 100 of FIG. 1.

At 202, the user 104 gets a document hash (e.g., document hash 112) of a document 106. In some examples, getting the document hash includes applying a hash function 110 (e.g., SHA-256) to the document 106 to generate the document hash 112. Alternatively, in other examples, the user 104 provides the document 106 to the cloud POS server 102 or another device and the cloud POS server 102 or other device generates the document hash 112 for the user 104.

At 204, the user 104 selects a document signing mode of the cloud POS server 102. In some examples, the cloud POS server 102 is configured to operate in a variety of different modes, including the described document signing mode, a document authentication mode or signature verification mode, a mode for processing transactions and/or payments, and/or the like. In some such examples, the user 104 selects to use the cloud POS server 102 in document signing mode using a physical POS device with which the cloud POS server 102 is associated. It should be understood that the document signing mode of the cloud POS server 102 is configured to enable the performance of the process 200 by the cloud POS server 102 as described herein.

At 206, the user 104 provides the document hash 112 to the cloud POS server 102. In some examples, the user 104 has obtained the document hash at 202 in a digital form and that digital document hash 112 is then provided to the cloud POS server 102 via a network connection as described herein.

At 208, the user 104 taps or dips the card 108 on a physical POS device 109 with which the cloud POS server 102 is associated. Alternatively, or additionally, in some examples, the user 104 interacts with the physical POS device 109 using the card 108 in another manner without departing from the description. Further, in some examples, the process includes the user 104 and/or a physical POS device 109 providing information about the card 108, such as a private key 114 of the card 108, to the cloud POS server 102.

At 210, the cloud POS server 102 provides the document hash 112 to the card 108. In some examples, this includes the cloud POS server 102 sending the document hash 112 to a physical POS device 109 with which the card 108 is interacting. At 212, the card 108 and/or the physical POS device 109 sign the document hash 112 with the card private key 114, generating a signed hash 120. In some examples, signing the document hash 112 includes encrypting the document hash 112 with the card private key 114 using an encryption function, whereby the resulting signed hash 120 can only be practically decrypted by using a public key 118 associated with the private key 114 of the card 108.

At 214, the card 108 and/or the physical POS device 109 provides the signed document hash 120 to the cloud POS server 102 and, at 216, in response to receiving the signed document hash 120, the cloud POS server 102 requests a public key certificate (e.g., issuer certificate 116) associated with the private key 114 of the card 108. In some examples, the cloud POS server 102 requests the public key certificate from the card 108 and/or the physical POS device 109. Alternatively, in other examples, the cloud POS server 102 requests or otherwise obtains the public key certificate from another party, such as an issuer of the card 108.

At 218, the public key certificate is provided to the cloud POS server 102 for use in completing the process 200 as described herein.

At 220, the cloud POS server 102 generates a unique signature ID 122. In some examples, the unique signature ID 122 is generated based on data of the signed hash 120. Alternatively, or additionally, other methods of generating the unique signature ID 122 are used that are not based on data of the signed hash 120 without departing from the description.

At 222, the generated unique signature ID 122 is appended to the signed hash 120 and then, at 224, the combined ID and signed hash are encoded. In some examples, the combined ID and signed hash are encoded using Base64, but in other examples, other methods of encoding are used without departing from the description. It should be understood that the encoding of the combined ID and signed hash enable the data to be stored efficiently, but in other examples, the process 200 does not include the encoding step without departing from the description.

At 226, the public key 118 of the card 108 is mapped to or otherwise associated with the generated unique signature ID 122 and the combined ID and card public key 126 are stored by the cloud POS server 102. In some examples, the public key 118 is obtained from the public key certificate as described herein. For instance, in an example, the public key certificate is signed by a private key of an issuer. The issuer public key is obtained in a CA certificate, which can be decrypted using a CA public key. Thus, the cloud POS server 102 decrypts the CA certificate using the CA public key to obtain the issuer public key and then uses the issuer public key to decrypt the public key certificate, obtaining the card public key 118. In other examples, other methods of obtaining the card public key 118 are used without departing from the description.

Upon the completion of the generation and storage of the combined signed hash and ID 124 and the combined ID and card public key 126, at 228, the cloud POS server 102 prompts the user 104 for instructions associated with sharing the signed document. In some examples, the user 104 is prompted to select other users and associated contact methods to which the document and associated signature data should be sent. Alternatively, or additionally, the user 104 is provided a link or other data that the user 104 is enabled to share with other users to enable those other users to authenticate the document 106.

At 230, the user 104 provides sharing instructions to the cloud POS server 102 and, at 232, the cloud POS server shares the encoded ID and signed hash with users indicated in the sharing instructions. For instance, in an example, the user 104 provides a list of email addresses of other users and the cloud POS server 102 provides the document and/or the encoded ID and signed hash to those other users using the provided list of email addresses. Alternatively, or additionally, the cloud POS server 102 provides a link to the document and/or the encoded ID and signed hash to those other users using the provided list of email addresses, or otherwise enables those other users to access the document and associated encoded ID and signed hash.

Additionally, or alternatively, in some examples, the user 104 is enabled to share the encoded ID and signed hash or otherwise to share access to the encoded ID and signed hash directly (e.g., the user 104 provides a link to another user that provides access to the encoded ID and signed hash stored on the cloud POS server 102). The use of the cloud POS server 102 and associated entities to authenticate the document 106 is described below with respect to FIGS. 3 and 4.

Figure 3:
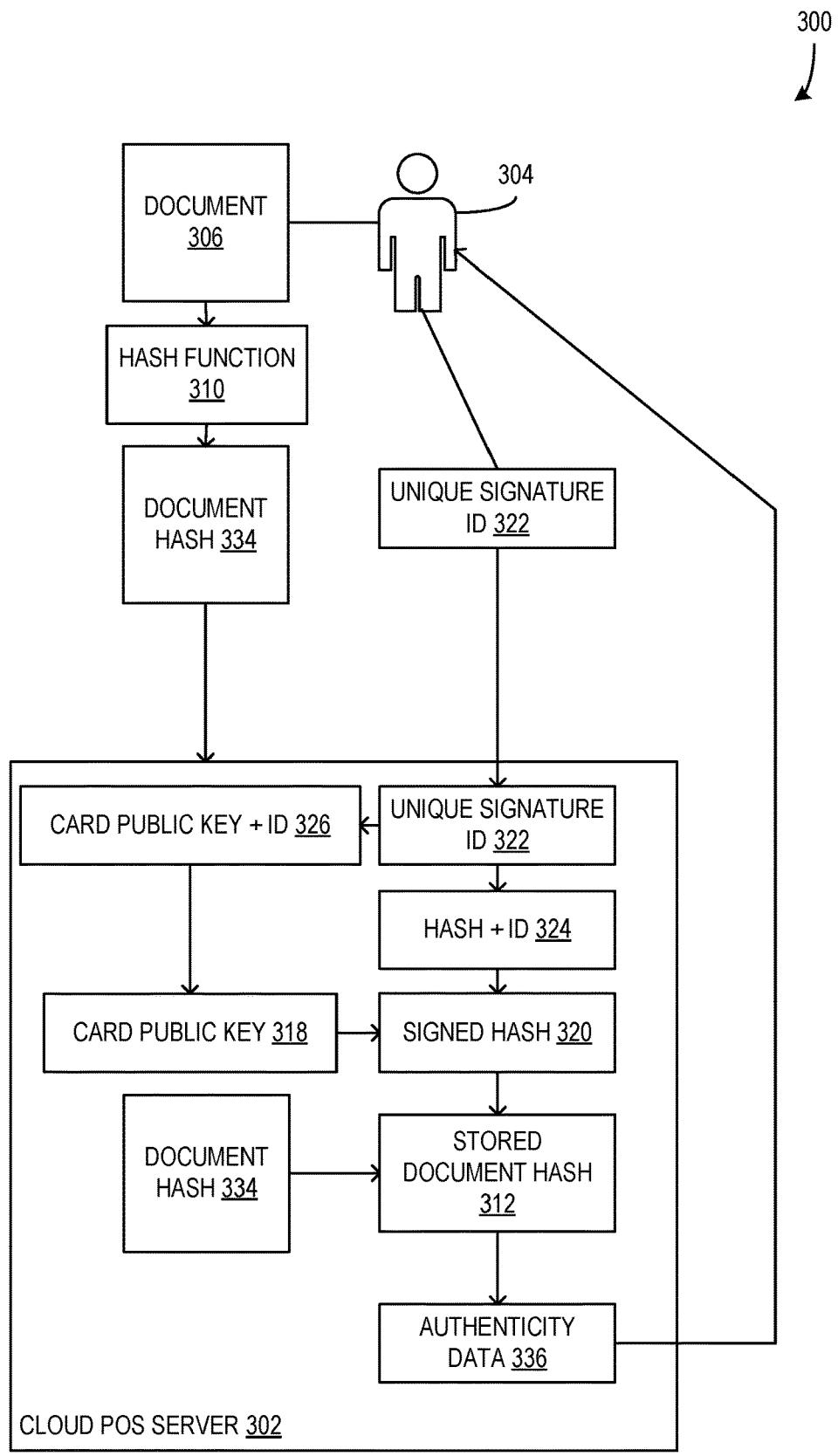
FIG. 3 is a block diagram illustrating a system configured to determine authenticity of a document signed using an example process, such as that of FIG. 2.

FIG. 3 is a block diagram illustrating a system 300 configured to determine authenticity of a document 306 signed using the system 100 of FIG. 1 and/or the process 200 of FIG. 2. In some examples, the cloud POS server 302 of system 300 is the cloud POS server 102 of system 100. Alternatively, in some examples, the cloud POS server 302 is different from the cloud POS server 102 but in communication therewith.

The user 304 has a document 306 and a unique signature ID 322 that is associated with the document 306. In some examples, the unique signature ID 322 was generated with respect to the document 306 during the process 200 as described above. The user is enabled to provide the document 306, the unique signature ID 322, and/or an associated document hash 334 to the cloud POS server 302 to authenticate the document 306 as described herein.

In some examples, the user 304 uses a hash function 310 to generate the document hash 334 from the document 306. The hash function 310 is the same as the hash function 110 that was used to initially generate the document hash 112 during the process 200. Alternatively, in some examples, the user 304 is enabled to provide the document 306 to the cloud POS server 302, which then uses the hash function 310 to generate the document hash 334.

Further, in some examples, the cloud POS server 302 is storing or otherwise has access to a combined card public key and ID 326 that is identifiable using the unique signature ID 322 provided by the user 304 (e.g., the ID of the combined card public key and ID 326 is the same as the unique signature ID 322). Thus, the cloud POS server 302 obtains the card public key 318 that should be associated with the document 306 from the combined card public key and ID 326. Further, the cloud POS server 302 uses the unique signature ID 322 to identify the combined hash and ID 324. In some examples, the cloud POS server 302 decodes the combined hash and ID 324 if it was previously encoded and then obtains the signed hash 320 by separating the unique signature ID 322 out from the combined hash and ID 324.

Then, in some such examples, the cloud POS server 302 decrypts or otherwise processes the signed hash 320 using the card public key 318 to generate the stored document hash 312 (e.g., the document hash 112 generated during the process 200). The cloud POS server 302 compares the document hash 334 generated from the document 306 with the stored document hash 312 and, if the two compared hashes match, the document 306 is found to be authentic. If the two compared hashes do not match, the document 306 is found to be inauthentic. The finding of authenticity or inauthenticity is provided to the user 304 as authenticity data 336 by the cloud POS server 302 in response to the provided document hash 334 and unique signature ID 322. In other examples, the authenticity data 336 includes other information, such as date/time data and/or version data associated with the stored document hash 312 or the like. If the document 306 is a new or different version of the document from the original document 106 that was used during process 200, it will be indicated to be inauthentic because the generated document hash 334 will be different from the original document hash 112. In other examples, the document 306 is found to be inauthentic for other reasons without departing from the description.

Figure 4:
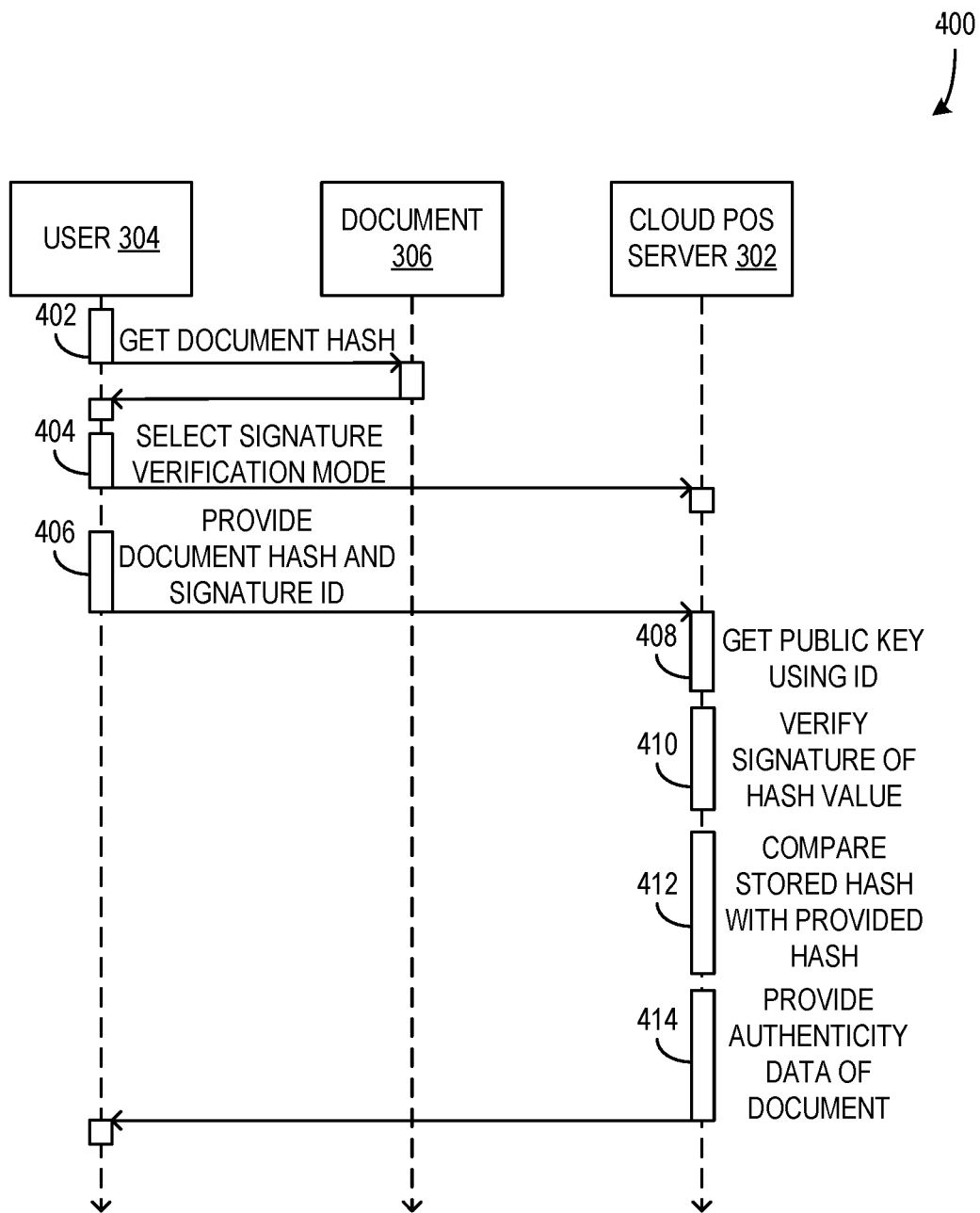
FIG. 4 is a sequence diagram illustrating a process for determining authenticity of a document signed using an example process, such as that of FIG. 2.

FIG. 4 is a sequence diagram illustrating a process 400 for determining authenticity of a document 306 signed using the process 200 of FIG. 2. In some examples, the process 400 is executed or otherwise performed in a system such as system 300 of FIG. 3.

At 402, the user 304 gets a document hash 334 of the document 306. In some examples, the user 304 uses a hash function 310 to generate the document hash 334 from the document 306. Alternatively, in some examples, the user 304 provides the document 306 to the cloud POS server 302, which uses the hash function 310 to generate the document hash 334 as described herein.

At 404, the user 304 selects a signature verification mode of the cloud POS server 302. In some examples, the cloud POS server 302 is configured to operate in a variety of different modes, including the document signing mode, the signature verification mode, a mode for processing transactions and/or payments, and/or the like. In some such examples, the user 304 selects to use the cloud POS server 302 in signature verification mode using a physical POS device or other computing device with which the cloud POS server 302 is in communication. It should be understood that the signature verification mode of the cloud POS server 302 is configured to enable the performance of the process 400 by the cloud POS server 302 as described herein.

At 406, the user 304 provides the document hash 334, the signature ID 322, and/or the document 306 to the cloud POS server 302. At 408, the cloud POS server 302 obtains a card public key 318 using the unique signature ID 322 as described above. For instance, in an example, the cloud POS server 302 identifies a combined card public key and ID 326 that includes the unique signature ID 322 and obtains the card public key 318 from that identified combined card public key and ID 326.

At 410, the cloud POS server 302 verifies the signature of the hash value and, at 412, the stored hash is compared to the provided hash as described herein. In some examples, the signed hash 320 is obtained from a combined hash and ID 324 that matches the provided unique signature ID 322. The signed hash 320 is then decrypted using the card public key 318 to obtain the stored document hash 312. That stored document hash 312 is compared to the provided document hash 334 to determine the authenticity of document 306. If the hashes match, the document 306 is found to be authentic. If the hashes do not match, the document 306 is found to be inauthentic.

At 414, the cloud POS server 302 provides the user 304 with the authenticity data of the document 306, wherein the authenticity data includes at least an indicator as to whether the document 306 has been found to be authentic or inauthentic, as described herein.

Figure 5:
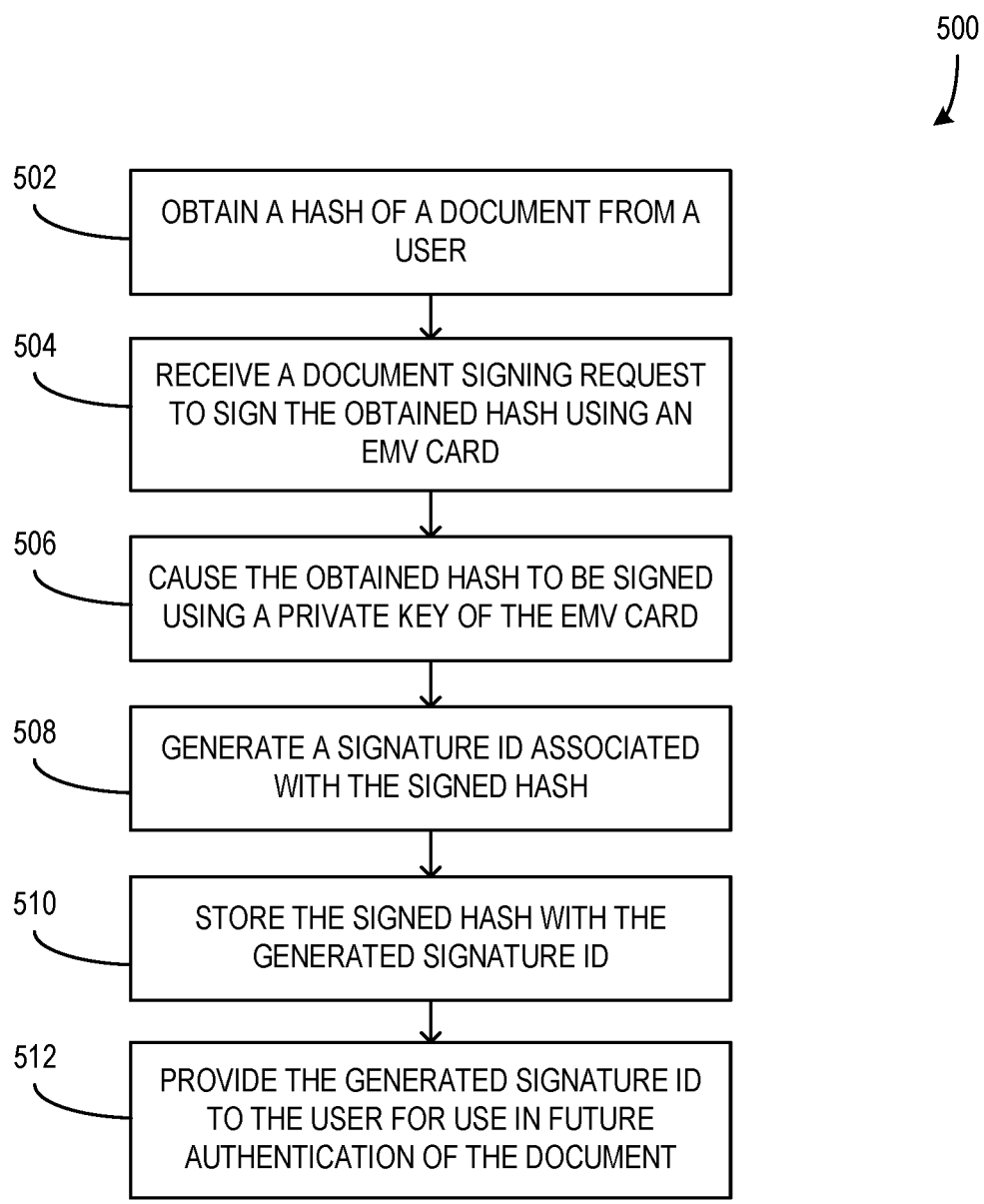
FIG. 5 is a flowchart illustrating a method for electronically signing a document using a card of a user.

FIG. 5 is a flowchart illustrating a method 500 for electronically signing a document (e.g., document 106) using a card (e.g., card 108) of a user (e.g., user 104). In some examples, the method 500 is executed or otherwise performed in a system such as system 100 of FIG. 1.

At 502, a hash of a document is obtained from a user. In some examples, the user generates the document hash 112 from the document 106 using a hash function 110 as described herein. Alternatively, in other examples, the user provides the document 106 to the cloud POS server 102 and the cloud POS server 102 uses a hash function 110 to generate the document hash 112 from the received document 106.

At 504, a document signing request to sign the obtained hash using an EMV card is received. In some examples, the document signing request is triggered based on the EMV card being presented to the cloud POS server 102 (e.g., the EMV card is tapped, scanned, or otherwise used to interact with a physical POS device 109 that is associated with the cloud POS server 102).

At 506, the cloud POS server causes the obtained hash to be signed using a private key of the EMV card. In some examples, the cloud POS server provides the obtained hash to the physical POS device 109 with which the EMV card 108 is interacting, such that the private key of the EMV card can be used to encrypt the data of the hash, thereby signing the hash, and generating a signed hash.

At 508, a signature ID associated with the signed hash is generated. In some examples, generating the signature ID is performed as described herein with respect to the unique signature ID 122.

At 510, the signed hash is stored in association with the generated signature ID. In some examples, the signed hash 120 and the signature ID 122 are combined into a combined hash and ID 124 as described herein. Further, in some examples, the resulting combined hash and ID 124 are encoded into a different format for storage (e.g., a Base64 format).

At 512, the generated signature is provided to the user for use in future authentication of the document. In some examples, the signature ID 122 is sent to the user 104 via the physical POS device 109 and/or via another communication method (e.g., via email and/or a link to a location in which the signature ID 122 is stored). Additionally, or alternatively, in some examples, the cloud POS server 102 prompts the user 104 to provide sharing instructions (e.g., at 230 of process 200). The cloud POS server 102 then receives sharing instructions from the user 104 and shares the signature ID 122 and/or the combined signed hash and ID 124 to at least one other user based on the sharing instructions.

Further, in some examples, the method 500 further includes obtaining the public key associated with the private key of the EMV card and storing the obtained public key in association with the generated signature ID. Thus, the stored public key enables decryption of the stored signed hash in response to document authentication requests. In some such examples, obtaining the public key is performed as described above with respect to obtaining the card public key 118 to FIGS. 1 and/or 2.

Figure 6:
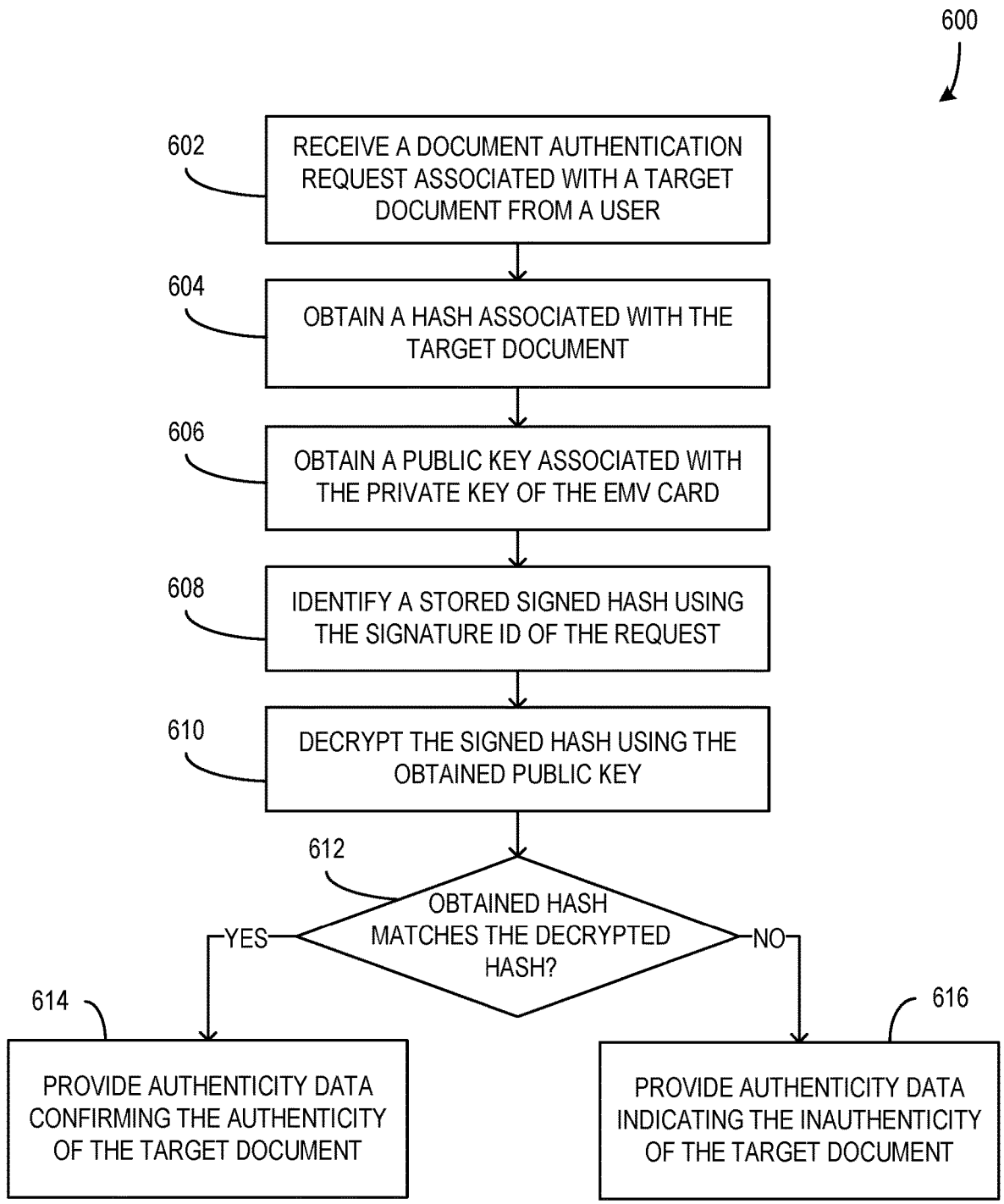
FIG. 6 is a flowchart illustrating a method for determining authenticity of a document signed using an example method, such as that of FIG. 5.

FIG. 6 is a flowchart illustrating a method 600 for determining authenticity of a document (e.g., document 306) signed using the method 500 of FIG. 5. In some examples, the method 600 is executed or otherwise performed in a system such as system 300 of FIG. 3. Further, in some examples, portions of the method 600 are performed in the same way as corresponding portions of the process 400 of FIG. 4 are performed as described above.

At 602, a document authentication request associated with a target document is received from a user. In some examples, the document authentication request includes the signature ID that was previously generated in association with a document hash of a document that has been signed using method 500. Additionally, or alternatively, the document authentication request includes a hash of the target document to be authenticated and/or the target document itself.

At 604, a hash associated with the target document is obtained. In some examples, the user has generated the document hash of the target document and provided that generated hash with the signature ID. Alternatively, in other examples, the target document is provided by the user and the hash of the target document is obtained by applying a hash function (e.g., hash function 310) to the target document as described herein.

At 606, a public key associated with the private key of the EMV card is obtained. In some examples, the public key associated with the private key of the EMV card is obtained by identifying a combined card public key and ID 326 with an ID that matches the provided signature ID 322. The card public key 318 of that combined card public key and ID 326 is used as the obtained public key throughout method 600.

At 608, a stored signed hash is identified using the signature ID of the document authentication request. In some examples, the stored signed hash is identified from a combined hash and ID 324 that includes the provided signature ID 322. Thus, the stored signed hash 320 is the hash of that combined hash and ID 324.

At 610, the identified signed hash is decrypted using the obtained public key. In some examples, the decryption method used to decrypt the signed hash using the public key is the decryption method that corresponds to the encryption method used to encrypt, or sign, the signed hash with the private key of the EMV card, as described above with respect to at least FIG. 5.

At 612, if the obtained hash matches the decrypted hash, the process proceeds to 614. Alternatively, if the obtained hash does not match the decrypted hash, the process proceeds to 616. It should be understood that, in some examples, the obtained hash matches the decrypted hash when the two hashes include identical data values. Any variance in the data values of the hashes results in the hashes not matching at 612.

At 614, authenticity data confirming the authenticity of the target document is provided in response to the document authentication request. Alternatively, at 616, authenticity data indicating the inauthenticity of the target document is provided in response to the document authentication request. In some examples, the provision of the authenticity data of the document is performed as described above at least with respect to 414 of process 400.

Exemplary Operating Environment

The present disclosure is operable with a computing apparatus according to an embodiment as a functional block diagram 700 in FIG. 7. In an example, components of a computing apparatus 718 are implemented as a part of an electronic device according to one or more embodiments described in this specification. The computing apparatus 718 comprises one or more processors 719 which may be microprocessors, controllers, or any other suitable type of processors for processing computer executable instructions to control the operation of the electronic device. Alternatively, or in addition, the processor 719 is any technology capable of executing logic or instructions, such as a hard-coded machine. In some examples, platform software comprising an operating system 720 or any other suitable platform software is provided on the apparatus 718 to enable application software 721 to be executed on the device. In some examples, signing and authenticating documents using card private keys as described herein is accomplished by software, hardware, and/or firmware.

In some examples, computer executable instructions are provided using any computer-readable media that is accessible by the computing apparatus 718. Computer-readable media include, for example, computer storage media such as a memory 722 and communications media. Computer storage media, such as a memory 722, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium does not include a propagating signal. Propagated signals per se are not examples of computer storage media. Although the computer storage medium (the memory 722) is shown within the computing apparatus 718, it will be appreciated by a person skilled in the art, that, in some examples, the storage is distributed or located remotely and accessed via a network or other communication link (e.g., using a communication interface 723).

Further, in some examples, the computing apparatus 718 comprises an input/output controller 724 configured to output information to one or more output devices 725, for example a display or a speaker, which are separate from or integral to the electronic device. Additionally, or alternatively, the input/output controller 724 is configured to receive and process an input from one or more input devices 726, for example, a keyboard, a microphone, or a touchpad. In one example, the output device 725 also acts as the input device. An example of such a device is a touch sensitive display. The input/output controller 724 may also output data to devices other than the output device, e.g., a locally connected printing device. In some examples, a user provides input to the input device(s) 726 and/or receives output from the output device(s) 725.

The functionality described herein can be performed, at least in part, by one or more hardware logic components. According to an embodiment, the computing apparatus 718 is configured by the program code when executed by the processor 719 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: obtain, by a cloud POS server, a hash of a document from a user; receive, by the cloud POS server, a document signing request to sign the obtained hash with an EMV card, the document signing request being received via a presentation of the EMV card; cause, by the cloud POS server, the obtained hash to be signed using a private key of the EMV card; generate, by the cloud POS server, a signature identifier (ID) associated with the signed hash; store, by the cloud POS server, the signed hash with the generated signature ID; and provide, by the cloud POS server, the generated signature ID to the user for use in future authentication of the document.

An example computerized method comprises obtaining, by a cloud POS server, a hash of a document from a user; receiving, by the cloud POS server, a document signing request to sign the obtained hash with an EMV card, the document signing request being received via a presentation of the EMV card; causing, by the cloud POS server, the obtained hash to be signed using a private key of the EMV card; generating, by the cloud POS server, a signature identifier (ID) associated with the signed hash; storing, by the cloud POS server, the signed hash with the generated signature ID; and providing, by the cloud POS server, the generated signature ID to the user for use in future authentication of the document.

One or more computer storage media having computer-executable instructions that, upon execution by a processor, case the processor to at least: obtain, by a cloud POS server, a hash of a document from a user; receive, by the cloud POS server, a document signing request to sign the obtained hash with an EMV card, the document signing request being received via a presentation of the EMV card; cause, by the cloud POS server, the obtained hash to be signed using a private key of the EMV card; generate, by the cloud POS server, a signature identifier (ID) associated with the signed hash; store, by the cloud POS server, the signed hash with the generated signature ID; and provide, by the cloud POS server, the generated signature ID to the user for use in future authentication of the document.

Alternatively, or in addition to the other examples described herein, examples include any combination of the following:

further comprising: receiving, by the cloud POS server, a document authentication request associated with a target document from a second user, wherein the document authentication request includes the generated signature ID; obtaining, by the cloud POS server, a second hash associated with the target document; obtaining, by the cloud POS server, a public key associated with the private key of the EMV card; identifying, by the cloud POS server, the stored signed hash using the generated signature ID from the document authentication request; decrypting, by the cloud POS server, the identified signed hash using the obtained public key; determining, by the cloud POS server, authenticity data of the target document based on a comparison of the second hash to the decrypted hash; and providing, by the cloud POS server, the determined authenticity data in response to the received document authentication request.

further comprising: obtaining a public key of the EMV card; and storing the obtained public key in association with the generated signature ID, whereby the stored public key enables decryption of the stored signed hash in response to document authentication requests.

wherein obtaining the public key of the EMV card further includes: obtaining an issuer certificate that includes the public key in encrypted form; obtaining a certification authority (CA) certificate that includes an issuer public key in encrypted form, wherein the issuer public key enables decryption of the public key included in the issuer certificate; obtaining a CA public key; decrypting the issuer public key included in the CA certificate using the obtained CA public key; and decrypting the public key included in the issuer certificate using the decrypted issuer public key.

wherein obtaining the hash of the document from the user further includes: obtaining the document from the user; and performing a hash function on the obtained document to form the hash.

further comprising: prompting the user for sharing instructions associated with the generated signature ID; receiving sharing instructions from the user; and sharing the generated signature ID with at least one other user based on the received sharing instructions.

wherein causing the obtained hash to be signed using a private key of the EMV card includes: receiving, by the cloud POS server, from a physical POS device, a message indicating that the EMV card is interacting with the physical POS device; providing, by the cloud POS server, the hash to the physical POS device, whereby the EMV card is enabled to sign the hash using the private key via the physical POS device; and receiving, by the cloud POS server, the signed hash from the physical POS device Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining, by a cloud POS server, a hash of a document from a user; exemplary means for receiving, by the cloud POS server, a document signing request to sign the obtained hash with an EMV card, the document signing request being received via a presentation of the EMV card; exemplary means for causing, by the cloud POS server, the obtained hash to be signed using a private key of the EMV card; exemplary means for generating, by the cloud POS server, a signature identifier (ID) associated with the signed hash; exemplary means for storing, by the cloud POS server, the signed hash with the generated signature ID; and exemplary means for providing, by the cloud POS server, the generated signature ID to the user for use in future authentication of the document.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
  a processor; and
  a memory comprising computer program code, the memory and the computer program code configured to cause the processor to:
    receive, by a cloud point of sale (POS) server, a document from a user and generate a hash of the document;
    receive, by the cloud POS server, a document signing request to sign the generated hash with an EMV card associated with the user, the document signing request being received via a presentation of the EMV card on a physical POS device associated with a cloud POS server;
    cause the generated hash to be signed using a private key of the EMV card;

using data of the signed hash, generate, by the cloud POS server, a signature identifier (ID) associated with the signed hash;

append the generated signature ID to the signed hash producing a combination;

encode the combination;

store, by the cloud POS server, the encoded combination provide, by the cloud POS server, the generated signature ID to the user for use in future authentication of the document; and share the document and the generated signature ID with a second user.

2. The system of claim 1, wherein the memory and the computer program code are configured to further cause the processor to:

receive, by the cloud POS server, a document authentication request associated with a target document from the second user, wherein the document authentication request includes the generated signature ID;

generate, by the cloud POS server, a second hash associated with the target document;

obtain, by the cloud POS server, a public key associated with the private key of the EMV card, wherein the public key associated with the private key of the EMV card is obtained by identifying a combined EMV card public key and ID with an ID that matches the generated signature ID;

identify, by the cloud POS server, the stored encoded combination using the generated signature ID from the document authentication request, and decode the encoded combination to obtain the signed hash;

decrypt, by the cloud POS server, the signed hash using the obtained public key;

determine, by the cloud POS server, authenticity data of the target document based on a comparison of the second hash to the decrypted hash; and provide, by the cloud POS server, the determined authenticity data in response to the received document authentication request.

3. The system of claim 1, wherein the memory and the computer program code are configured to further cause the processor to:

obtain a public key of the EMV card; and store the obtained public key in association with the generated signature ID, whereby the stored public key enables decryption of the stored encoded combination in response to document authentication requests.

4. The system of claim 3, wherein obtaining the public key of the EMV card further includes:

obtaining an issuer certificate that includes the public key in encrypted form;

obtaining a certification authority (CA) certificate that includes an issuer public key in encrypted form, wherein the issuer public key enables decryption of the public key included in the issuer certificate;

obtaining a CA public key;

decrypting the issuer public key included in the CA certificate using the obtained CA public key; and decrypting the public key included in the issuer certificate using the decrypted issuer public key.

5. The system of claim 1, wherein obtaining the hash of the document from the user further includes:

obtaining the document from the user; and performing a hash function on the obtained document to form the hash.

6. The system of claim 1, wherein the memory and the computer program code are configured to further cause the processor to:

prompt the user for sharing instructions associated with the generated signature ID;

receive sharing instructions from the user; and share the generated signature ID with at least one other user based on the received sharing instructions.

7. The system of claim 1, wherein causing the generated hash to be signed using a private key of the EMV card includes:

receiving, by the cloud POS server, from a physical POS device, a message indicating that the EMV card is interacting with the physical POS device;

providing, by the cloud POS server, the hash to the physical POS device, whereby the EMV card is enabled to sign the hash using the private key via the physical POS device; and receiving, by the cloud POS server, the signed hash from the physical POS device.

8. A computerized method comprising:

receiving, by a cloud point of sale (POS) server, a document from a user and generate a hash of the document;

receiving, by the cloud POS server, a document signing request to sign the generated hash with an EMV card associated with the user, the document signing request being received via a presentation of the EMV card on a physical POS device associated with a cloud POS server;

causing, by the cloud POS server, the generated hash to be signed using a private key of the EMV card;

using data of the signed hash, generating, by the cloud POS server, a signature identifier (ID) associated with the signed hash;

appending the generated signature ID to the signed hash producing a combination;

encoding the combination;

storing, by the cloud POS server, the encoded combination providing, by the cloud POS server, the generated signature ID to the user for use in future authentication of the document and sharing the document and the generated signature ID with a second user.

9. The computerized method of claim 8, further comprising:

receiving, by the cloud POS server, a document authentication request associated with a target document from the second user, wherein the document authentication request includes the generated signature ID;

generating, by the cloud POS server, a second hash associated with the target document;

obtaining, by the cloud POS server, a public key associated with the private key of the EMV card, wherein the public key associated with the private key of the EMV card is obtained by identifying a combined EMV card public key and ID with an ID that matches the generated signature ID;

identifying, by the cloud POS server, the stored encoded combination using the generated signature ID from the document authentication request and decoding the encoded combination to obtain the signed hash;

decrypting, by the cloud POS server, the signed hash using the obtained public key;

determining, by the cloud POS server, authenticity data of the target document based on a comparison of the second hash to the decrypted hash; and providing, by the cloud POS server, the determined authenticity data in response to the received document authentication request.

10. The computerized method of claim 8, further comprising:

obtaining a public key of the EMV card; and storing the obtained public key in association with the generated signature ID, whereby the stored public key enables decryption of the stored encoded combination in response to document authentication requests.

11. The computerized method of claim 10, wherein obtaining the public key of the EMV card further includes:

obtaining an issuer certificate that includes the public key in encrypted form;

obtaining a certification authority (CA) certificate that includes an issuer public key in encrypted form, wherein the issuer public key enables decryption of the public key included in the issuer certificate;

obtaining a CA public key;

decrypting the issuer public key included in the CA certificate using the obtained CA public key; and decrypting the public key included in the issuer certificate using the decrypted issuer public key.

12. The computerized method of claim 8, wherein obtaining the hash of the document from the user further includes:

obtaining the document from the user; and performing a hash function on the obtained document to form the hash.

13. The computerized method of claim 8, further comprising:

prompting the user for sharing instructions associated with the generated signature ID;

receiving sharing instructions from the user; and sharing the generated signature ID with at least one other user based on the received sharing instructions.

14. The computerized method of claim 8, wherein causing the generated hash to be signed using a private key of the EMV card includes:

receiving, by the cloud POS server, from a physical POS device, a message indicating that the EMV card is interacting with the physical POS device;

providing, by the cloud POS server, the hash to the physical POS device, whereby the EMV card is enabled to sign the hash using the private key via the physical POS device; and receiving, by the cloud POS server, the signed hash from the physical POS device.

15. A computer storage medium has computer-executable instructions that, upon execution by a processor, cause the processor to at least:

receive, by a cloud point of sale (POS) server, a document from a user and generate a hash of the document;

receive, by the cloud POS server, a document signing request to sign the generated hash with an EMV card associated with the user, the document signing request being received via a presentation of the EMV card on a physical POS device associated with a cloud POS server;

cause, by the cloud POS server, the generated hash to be signed using a private key of the EMV card;

using data of the signed hash, generate, by the cloud POS server, a signature identifier (ID) associated with the signed hash;

append the generated signature ID to the signed hash producing a combination;

encode the combination;

store, by the cloud POS server, the encoded combination provide, by the cloud POS server, the generated signature ID to the user for use in future authentication of the document; and share the document and the generated signature ID with a second user.

16. The computer storage medium of claim 15, wherein the computer-executable instructions, upon execution by the processor, further causes the processor to at least:

receive, by the cloud POS server, a document authentication request associated with a target document from the second user, wherein the document authentication request includes the generated signature ID;

generate, by the cloud POS server, a second hash associated with the target document;

obtain, by the cloud POS server, a public key associated with the private key of the EMV card, wherein the public key associated with the private key of the EMV card is obtained by identifying a combined EMV card public key and ID with an ID that matches the generated signature ID;

identify, by the cloud POS server, the stored encoded combination using the generated signature ID from the document authentication request and decode the encoded combination to obtain the signed hash;

decrypt, by the cloud POS server, the signed hash using the obtained public key;

determine, by the cloud POS server, authenticity data of the target document based on a comparison of the second hash to the decrypted hash; and provide, by the cloud POS server, the determined authenticity data in response to the received document authentication request.

17. The computer storage medium of claim 15, wherein the computer-executable instructions, upon execution by the processor, further causes the processor to at least:

obtain a public key of the EMV card; and store the obtained public key in association with the generated signature ID, whereby the stored public key enables decryption of the stored encoded combination in response to document authentication requests.

18. The computer storage medium of claim 17, wherein obtaining the public key of the EMV card further includes:

obtaining an issuer certificate that includes the public key in encrypted form;

obtaining a certification authority (CA) certificate that includes an issuer public key in encrypted form, wherein the issuer public key enables decryption of the public key included in the issuer certificate;

obtaining a CA public key;

decrypting the issuer public key included in the CA certificate using the obtained CA public key; and decrypting the public key included in the issuer certificate using the decrypted issuer public key.

19. The computer storage medium of claim 15, wherein obtaining the hash of the document from the user further includes:

obtaining the document from the user; and performing a hash function on the obtained document to form the hash.

20. The computer storage medium of claim 15, wherein the computer-executable instructions, upon execution by the processor, further causes the processor to at least:

prompt the user for sharing instructions associated with the generated signature ID;
receive sharing instructions from the user; and
share the generated signature ID with at least one other user based on the received sharing instructions.

* * * * *